United States Patent
Worzyk et al.

(10) Patent No.: US 9,741,212 B2
(45) Date of Patent: Aug. 22, 2017

(54) BEND STIFFENER WITH BEND INDICATION

(71) Applicant: ABB HV Cables (Switzerland) GmbH, Baden (CH)

(72) Inventors: Thomas Worzyk, Lyckeby (SE); Björn Zettervall, Nättraby (SE)

(73) Assignee: ABB HV Cables (Switzerland) GmbH, Baden (CH)

( * ) Notice: Subject to any disclaimer, the term of this patent is extended or adjusted under 35 U.S.C. 154(b) by 0 days.

(21) Appl. No.: 15/300,575

(22) PCT Filed: Apr. 25, 2014

(86) PCT No.: PCT/EP2014/058508
§ 371 (c)(1),
(2) Date: Sep. 29, 2016

(87) PCT Pub. No.: WO2015/161894
PCT Pub. Date: Oct. 29, 2015

(65) Prior Publication Data
US 2017/0109979 A1   Apr. 20, 2017

(51) Int. Cl.
*H01B 7/32* (2006.01)
*H01B 7/17* (2006.01)
(Continued)

(52) U.S. Cl.
CPC .......... *G08B 5/02* (2013.01); *H01B 7/17* (2013.01); *H01B 7/32* (2013.01); *H02G 9/06* (2013.01)

(58) Field of Classification Search
CPC .......... D07B 1/145; G01L 55/06; G08B 5/02; H01B 7/17; H01B 7/32; H02G 9/06
(Continued)

(56) References Cited

U.S. PATENT DOCUMENTS 3,572,091 A * 3/1971 McFarland ............. G01B 5/30
33/501.03
3,613,679 A * 10/1971 Bijou ............... A61F 13/00059
602/75
(Continued)

FOREIGN PATENT DOCUMENTS

EP   0911482 A2   4/1999
FR   2922291 A1   4/2009
(Continued)

OTHER PUBLICATIONS

International Search Report & Written Opinion of the International Searching Authority Application No. PCT/EP2014/058508 Completed: Dec. 3, 2014; Mailing Date: Dec. 23, 2014 10 pages.

*Primary Examiner* — R. A. Smith
(74) *Attorney, Agent, or Firm* — Whitmyer IP Group LLC

(57) ABSTRACT

A bend stiffener including a body tapering from a base to a top. The body has a central through-opening, extending from the base to the top, which is arranged to receive a subsea cable or umbilical, and a first bend indicator arranged on the body. The first bend indicator has a proximal portion having a fixed end which is fixed relative to the body and a distal portion which has a free end. The first bend indicator extending from the fixed end to the free end in the axial direction of the body. The distal portion covers a bend indication portion of the bend stiffener, which bend indication portion has a first visual appearance, and which distal portion has a second visual appearance. The first visual appearance differs from a visual appearance of an area of the bend stiffener surrounding the bend indication portion.

13 Claims, 3 Drawing Sheets

(51) Int. Cl.
*H02G 9/06* (2006.01)
*G08B 5/02* (2006.01)

(58) Field of Classification Search
USPC .......................................................... 116/212
See application file for complete search history.

(56) References Cited

U.S. PATENT DOCUMENTS

| | | | | |
|---|---|---|---|---|
| 4,213,463 A | * | 7/1980 | Osenkarski | A61B 5/0408 |
| | | | | 116/322 |
| 4,958,853 A | * | 9/1990 | Doty | B60R 22/16 |
| | | | | 116/203 |
| 5,146,645 A | * | 9/1992 | Dirksing | A46B 5/0062 |
| | | | | 15/143.1 |
| 5,605,035 A | * | 2/1997 | Pethrick et al. | D07B 1/145 |
| | | | | 116/207 |
| 6,437,248 B1 | | 8/2002 | Giebel | |
| 6,906,264 B1 | | 6/2005 | Grant, Jr. et al. | |
| 7,422,256 B2 | * | 9/2008 | Mueller | B66C 1/18 |
| | | | | 294/74 |
| 7,730,846 B2 | * | 6/2010 | Pett et al. | A46B 15/0002 |
| | | | | 116/212 |
| 7,967,070 B2 | | 6/2011 | Reddy | |
| 8,662,004 B2 | * | 3/2014 | Gardner et al. | G01L 7/026 |
| | | | | 116/212 |
| 9,032,809 B2 | * | 5/2015 | Kemnitz et al. | G01L 1/242 |
| | | | | 73/800 |
| 9,244,046 B2 | * | 1/2016 | Jones et al. | G01N 31/22 |
| 9,472,321 B2 | * | 10/2016 | Stang | H01B 7/32 |
| 2008/0078320 A1 | * | 4/2008 | Mattchen et al. | G01L 5/047 |
| | | | | 116/212 |
| 2012/0222765 A1 | | 9/2012 | Alexander et al. | |

FOREIGN PATENT DOCUMENTS

| | | | | |
|---|---|---|---|---|
| GB | 1142752 A | | 2/1969 | |
| JP | 2013104467 A | | 5/2013 | |
| JP | 2015042060 A | * | 3/2015 | H01B 7/32 |
| WO | 2009109745 A1 | | 9/2009 | |
| WO | 2011000881 A2 | | 1/2011 | |
| WO | 2011033796 A1 | | 3/2011 | |

* cited by examiner

BEND STIFFENER WITH BEND INDICATION

TECHNICAL FIELD

The present disclosure generally relates to subsea cables and umbilicals. In particular it relates to a bend stiffener for a subsea cable or umbilical installation.

BACKGROUND

Bend stiffeners are typically used at a location where a flexible subsea cable, such as a subsea power cable or submarine telecommunication cable, or an umbilical is received in a rigid or fixed installation. A bend stiffener typically has an elongated conical shape with a cylindrical through-opening for receiving a subsea cable or umbilical, and the base of the bend stiffener is provided with fasteners for attachment of the bend stiffener to the fixed installation.

The bending stiffness of the bend stiffener increases towards the base and shall in this manner prevent a subsea cable or umbilical extending through the bend stiffener from bending below a minimum bending radius. The minimum bending radius is the minimum allowed radius of a subsea cable or umbilical when bent. If a subsea cable or umbilical is curved more than the minimum bending radius, there is a risk that it is damaged or cracked.

For each application the bend stiffener's bending stiffness is calculated based on the desired characteristics in order to protect the subsea cable or umbilical optimally from overbending. It does however not mechanically prevent the subsea cable or umbilical from bending below the minimum bending radius. Especially during offshore handling of a joint between two subsea power cables, bending radii smaller than permitted may occur.

SUMMARY

In view of the above an object of the present disclosure is thus to provide a bend stiffener which provides an indication of when there is a risk of overbending of a subsea power cable during installation thereof.

There is hence provided a bend stiffener comprising a body having a base and a top, which body is tapering from the base to the top, wherein the body has a central through-opening extending from the base to the top, which through-opening is arranged to receive a subsea power cable, and a first bend indicator arranged on the body, wherein the first bend indicator has a proximal portion having a fixed end which is fixed relative to the body and a distal portion which has a free end, the first bend indicator extending from the fixed end to the free end in the axial direction of the body, wherein the distal portion covers a bend indication portion of the bend stiffener, which bend indication portion has a first visual appearance, and which distal portion of the first bend indicator has a second visual appearance, wherein the first visual appearance differs from a visual appearance of an area of the bend stiffener surrounding the bend indication portion.

By means of the bend indicator and the bend indication portion it is possible to optically indicate when the bend stiffener is bent more than what would be allowable, to ensure that a subsea power cable arranged in the bend stiffener is not damaged during installation due to overbending. In particular, the bend indication portion is exposed when the body is bent, and since the bend indication portion has a different visual appearance than the distal portion, and the area surrounding the bend indication portion, it is possible to visually detect overbending of the body, and thus in particular of a subsea power cable arranged in the bend stiffener. By means of the visual indication, installation engineers may be able to act promptly in the event overbending occurs.

According to one embodiment the bend indication portion is the external surface of the body.

According to one embodiment the bend stiffener comprises a second bend indicator having a proximal portion and a distal portion, and wherein the bend indication portion is the proximal portion of the second bend indicator, wherein the distal portion of the second bend indicator has the second visual appearance, the first bend indicator and the second bend indicator being arranged along the body in the axial direction.

According to one embodiment the distal portion of the first bend indicator covers a first section of the distal portion of the second bend indicator. It may be desirable to allow a certain bending of the bend stiffener and thus of a subsea power cable arranged in the bend stiffener without exposing the proximal portions. The bend indicators may therefore be dimensioned such that a distal portion covers also a section of a distal portion of an adjacent bend indicator. A proximal portion of the second bend indicator will thus not be exposed as long as a bending within a certain allowable range occurs.

According to one embodiment a dimension of the first section is determined by a minimum bending radius allowed for the bend stiffener.

According to one embodiment the bend indication portion is covered by the first bend indicator as long as the bending radius of the bend stiffener is above a predefined value. The predefined value may for example be the minimum bending radius, or slightly above the minimum bending radius such that the engineers handling the installation are able to react prior to the bend stiffener and thus the subsea cable/umbilical achieves the minimum bending radius.

According to one embodiment the first bend indicator extends from its proximal portion towards its distal portion in a direction from the base towards the top.

According to one embodiment the first visual appearance is a first colour and the second visual appearance is a second colour.

One embodiment comprises a plurality of bend indicator covering at least 40% of the envelope surface of the body.

According to one embodiment the first bend indicator is a band extending around at least a portion of the perimeter of the body.

According to one embodiment the first bend indicator extends around the entire perimeter of the body.

According to one embodiment the first bend indicator extends at most around half the perimeter.

According to one embodiment the first bend indicator is non-elastic.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which:

FIG. 1b schematically depicts a cross-section along A-A of the bend stiffener in FIG. 1a;

FIG. 1c schematically depicts a detailed view of bend indicators of the bend stiffener in FIG. 1a;

FIG. 2b depicts a detailed view of the bend indicators of the bend stiffener in FIG. 2a.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1A:
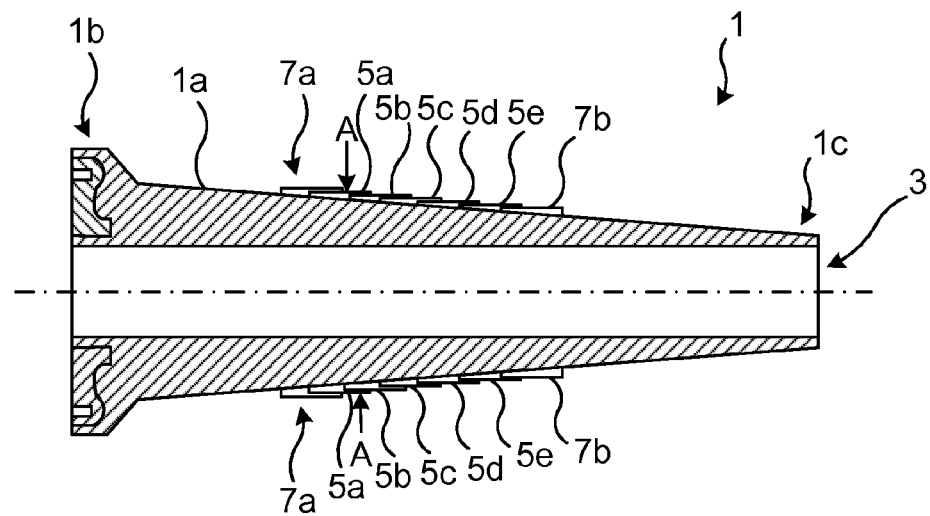
FIG. 1a schematically depicts a sectional view of an example of a bend stiffener.

FIG. 1a depicts an example of a bend stiffener 1. The bend stiffener 1 has a body 1a which has a base 1b and a top 1c. The body 1a is tapering from the base 1a towards the top 1b. The diameter of the body 1a is hence larger at the base 1a than at the top 1b. Although the exemplified body 1a is conical, it is envisaged that according to some variations the body could instead have other shapes such as concave, tapering from the base towards the top.

The body 1a of the exemplified bend stiffener 1 has a substantially cylindrical through-opening 3 extending centrally through the body 1a from the base 1b to the top 1c. The through-opening 3 is dimensioned such that the body 1a is able to receive a subsea power cable in the through-opening 3, extending through the entire body 1a from the base 1b to the top 1c. The wall thickness of the body 1a hence decreases gradually towards the top 1c. The body 1a may for example be made of a polymer material such as a thermosetting polymer, for instance polyurethane.

The bend stiffener 1 comprises a plurality of bend indicators 5a-5e, inter alia a first bend indicator 5a and a second bend indicator 5b, arranged axially along the body 1a. Each bend indicator 5a-5e overlaps with an adjacent bend indicator 5a-5e, and thus covers a portion of an adjacent bend indicator 5a-5e. The bend stiffener 1 also comprises an outermost bend indicator 7a relative to the base 1b and an outermost bend indicator 7b relative to the top 1c. The outermost bend indicator 7a covers a portion of an adjacent bend indicator 5a and the penultimate bend indicator 5e covers a portion of the outermost bend indicator 7b.

Figure 1B:
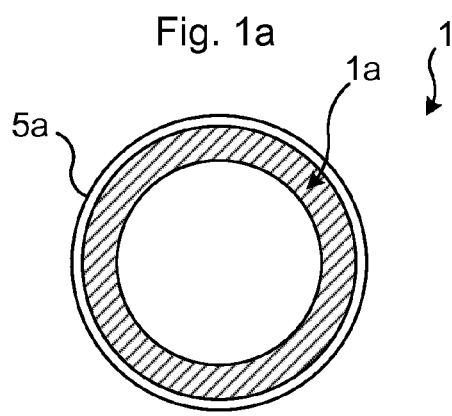
Figure 3A:
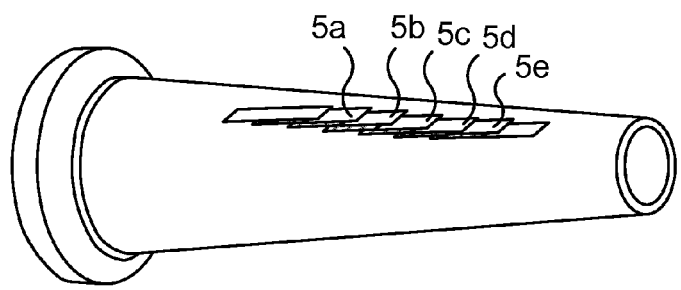
FIGS. 3a-b shows two variations of how bend indicators can be arranged on a bend stiffener.
Figure 3B:
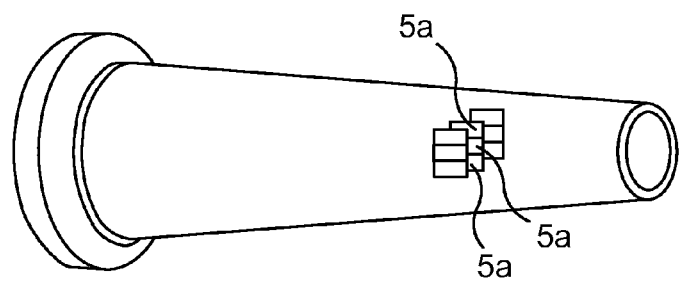

According to the example shown in FIG. 1a, each bend indicator 5a-5e and 7a-7b extends around the entire perimeter of the body 1a, as shown in FIG. 1b. Each bend indicator 5a-5e and 7a-7b hence defines a band which extends around the perimeter of the body 1a. Other variations are however also possible; instead of each bend indicator defining a band around the perimeter, each bend indicator could be a rectangular piece, wherein a plurality of such rectangular pieces would be provided around the perimeter of the body in a fish scale-like manner. Examples of variations of the bend stiffener are shown in FIGS. 3a and 3b. In FIG. 3a a plurality of rectangular bend indicators extending in the axial direction along a straight line on the external surface of the bend stiffener are shown. In FIG. 3b, a plurality of rectangular bend indicators are arranged in a number of rows. As can be understood from this disclosure, a great plurality of variations of the arrangement and shape of the bend indicators would be possible.

Figure 1C:
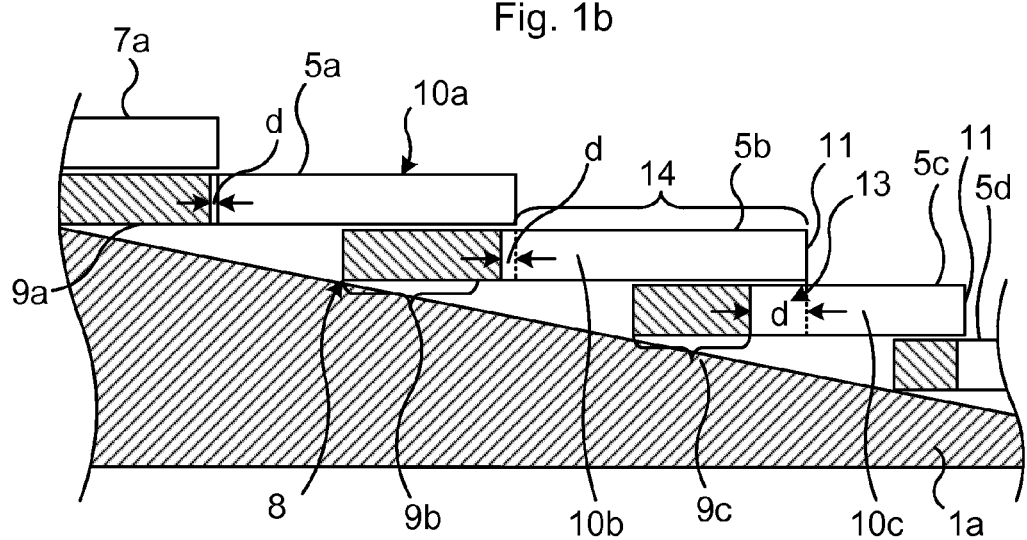

With reference to FIG. 1c a detailed view of bend indicators 7a, and 5a-5d is shown. It should be noted that the magnitude of overlap between the bend indicators is greatly exaggerated for the purpose of illustration. Each bend indicator 5a-5e comprises a proximal portion which is proximal relative to the body 1a and a distal portion. In FIG. 1c proximal portions 9a, 9b and 9c are shown for bend indicators 5a, 5b and 5c, and distal portions 10a, 10b and 10c are shown for the same bend indicators 5a, 5b and 5c. This generally applies to any bend indicator 5a-5e arranged between the outermost bend indicators 7a and 7b, and also to the outermost bend indicator 7b closest to the top 1c. Each proximal portion 9a, 9b, 9c has a fixed end 8 which is fixed relative to the body 1a, in FIG. 1c only shown for proximal portion 9b of bend indicator 5b. Each distal portion 10a, 10b, 10c has a free end 11, in FIG. 1c only shown for distal portions 10b and 10c of bend indicators 5b and 5c. The distal portion of each bend indicator 5a-5e, 7a-7b is in particular able to move relative to the body 1a and relative to any adjacent bend indicator 5a-5e, 7a-7b when bending occurs. The distal portion will therefore not follow the curvature of the body 1a precisely when bending occurs.

The proximal portion of each bend indicator 5a-5e, 7b has a first visual appearance and the distal portion of each bend indicator 5a-5e, 7b has a second visual appearance. In particular, the surface of each bend indicator 5a-5e, 7b, which surface faces away from the body, has the first visual appearance at its proximal portion and the second visual appearance at its distal portion. Both the proximal portion and the distal portion of the outermost bend indicator 7a relative to the base 1b may according to one variation have the second visual appearance, i.e. only one visual appearance. The proximal portions 9a may for example have a first colour and the distal portions 9b may for example have a second colour. In case the differing visual appearances are different colouring, it is preferable to utilise colours that substantially differ to obtain easy optical indication of bending of the bend stiffener 1 even at greater distances.

The distal portion of each of the bend indicators 5a-5e and 7a covers a respective bend indication portion of the bend stiffener 1, which according to the present example are the proximal portions of adjacent bend indicator 5a-5e and 7b. Thus, for example distal portions 10a and 10b of bend indicators 5a and 5b covers bend indication portions 9b and 9c, i.e. the proximal portions 9b and 9c, of bend indicators 5b and 5c, respectively. The proximal portion of the outermost bend indicator 7b relative to the top 1c is thus also covered by a bend indicator 5a-5e. The outermost bend indicator relative to the base 1b has an exposed proximal portion as it is not covered by any other bend indicator. It does however cover the proximal portion 9a of an adjacent bend indicator 5a.

Preferably, each bend indicator 5a-5e, 7a-7b extends from its proximal portion to its distal portion in a direction towards the top 1c. The proximal portion of a bend indicator 5a-5e, 7a-7b is hence closer to the base 1b than the distal portion of the same bend indicator 5a-5e, 7a-7b.

According to one variation, the distal portion of each bend indicator 5a-5e, 7a also covers a first section 13 of the distal portion of an adjacent bend indicator 5a-5e, 7b. For each bend indicator 5a-5e, 7a the first section 13 extends in a direction from the fixed end 8 towards the free end 11. The amount of a distal portion, i.e. a distance d, covered by an adjacent distal portion is dependent of the axial location of the bend indicator 5a-5e, 7b along the body 1a. The first section 13 of the bend indicators 5a-5e, 7b may for example become longer the closer a bend indicator 5a-5e, 7b is located to the top 1c, since bending is more pronounced in this portion of the body 1a due to the gradual decrease of the wall thickness of the body 1a towards the top 1c, wherein greater bending of the bend stiffener 1 may be allowed towards the top 1c although of course not more than the minimum bending radius. For this purpose, the axial length dimension of the bend indicators may be dependent of their position along the body 1a. Alternatively or additionally, the length ratio between the proximal portion and the distal portion of a bend indicator may depend on the location of the bend indicator along the body 1a with the ratio decreasing in a direction towards the top 1c.

Alternatively, according to one variation, each bend indicator between the innermost and outermost bend indicators covers the distal portion of an adjacent bend indicator essentially equally along the axial direction. The first section, i.e. the covered section, in this case corresponds to a length which allows bending of the bending of the bend stiffener 1 without exposure of the proximal portions 9a until the minimum bending radius is obtained.

In either case mentioned above, a second section 14 of the distal portions 9b is not covered by any adjacent bend indicator, at least for the majority of bend indicators. The second visual appearance of the distal portions is thus visible also when the bend stiffener 1 is not subjected to any bending forces.

The bend indicators 5a-5e, 7a-7b may be made of an elastic material such as rubber or from a non-elastic material such as a non-elastic plastic.

The bend indicators 5a-5e, 7a-7b may be attached to the body 1a for example by means of gluing of the proximal portions, e.g. by their fixed ends 8, to the body 1a. Alternatively, the bend indicators 5a-5e, 7a-7b may be attached to an elastic substrate such as a rubber mat, wherein the elastic substrate is attached to the external surface of the body 1a. In this case the bend indicators may be attached to the elastic substrate in a first step, wherein the elastic substrate provided with the bend indicators is attached to the body 1a by means of gluing.

Figure 1D:
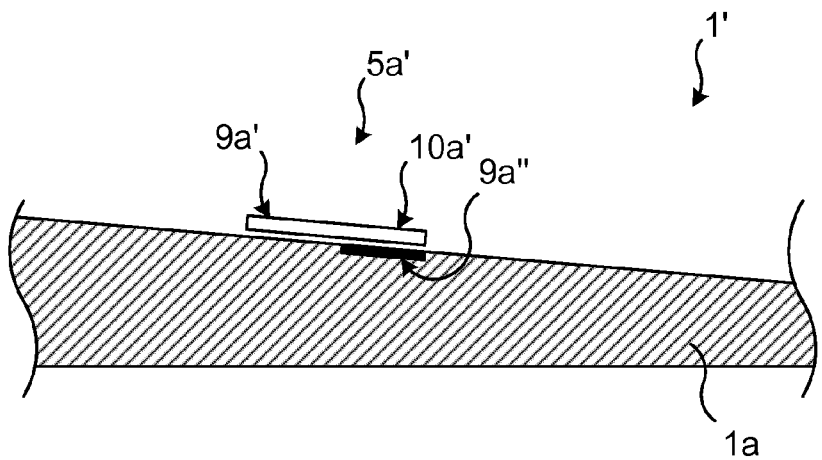
FIG. 1d schematically depicts a detailed view of another example of a bend stiffener.

FIG. 1d shows another example of a bend stiffener. Bend stiffener 1' has visual bend indication properties similar to those of the above-exemplified bend stiffener 1. The bend stiffener 1 comprises a body 1a which has a bend indication portion 9a" which has a first visual appearance, which differs from the visual appearance of an area of the bend stiffener 1' surrounding the bend indication portion 9a". According to one variation, the visual appearance of the area surrounding the bend indication portion 9a" and the first visual appearance of the bend indication portion 9a" are different colours. The bend stiffener 1' comprises a first bend indicator 5a' which has a proximal portion 9a' having a fixed end which is fixed relative to the body 1a, and a distal portion 10a' which has a free end relative to the body 1a. The distal portion 10a' covers the bend indication portion 9a", and has a second visual appearance which differs from the first visual appearance. When the bend stiffener 1' is bent such that the bending radius of the bend stiffener 1' is smaller than a predefined value, the bend indication portion 9a" is exposed from underneath the distal portion 10a'. A visual indication that the bending radius of the bend stiffener 1' has decreased below the predefined value may thereby be obtained. Typically, both the proximal portion 9a' and the distal portion 10a' of this example have the same visual appearance, i.e. the second visual appearance.

According to variations of the bend stiffener 1', it may comprise a plurality of bend indicators 5a' arranged along the body in the axial direction, wherein each such bend indicator may cover a bend indication portion 9a", i.e. a portion of the body which has a different visual appearance than the second visual appearance of the bend indicators. Furthermore, one variation may include a combination of overlapping bend indicators of the type described in the example in FIGS. 1a-c and bend indicators and bend indication portions of the type described in the example in FIG. 1d.

The functioning of the bend stiffener 1 will now be described in more detail with reference to FIGS. 2a and 2b. Bend stiffener 1' functions in an analogous manner i.e. the same principles apply, as has been described briefly above.

The bend stiffener 1 defines an interface for a subsea cable or an umbilical as it is received in a fixed installation or rigid structure, with a gradually increasing stiffness towards the base 1b. The bend stiffener 1 has fasteners 2 for attaching the bend stiffener 1 to a fixed installation or to a rigid structure such as a rigid joint for joining for example two subsea power cables. The fasteners may for example include a metal inlay arranged in the base, and comprise openings for attachment of bolts.

Figure 2A:
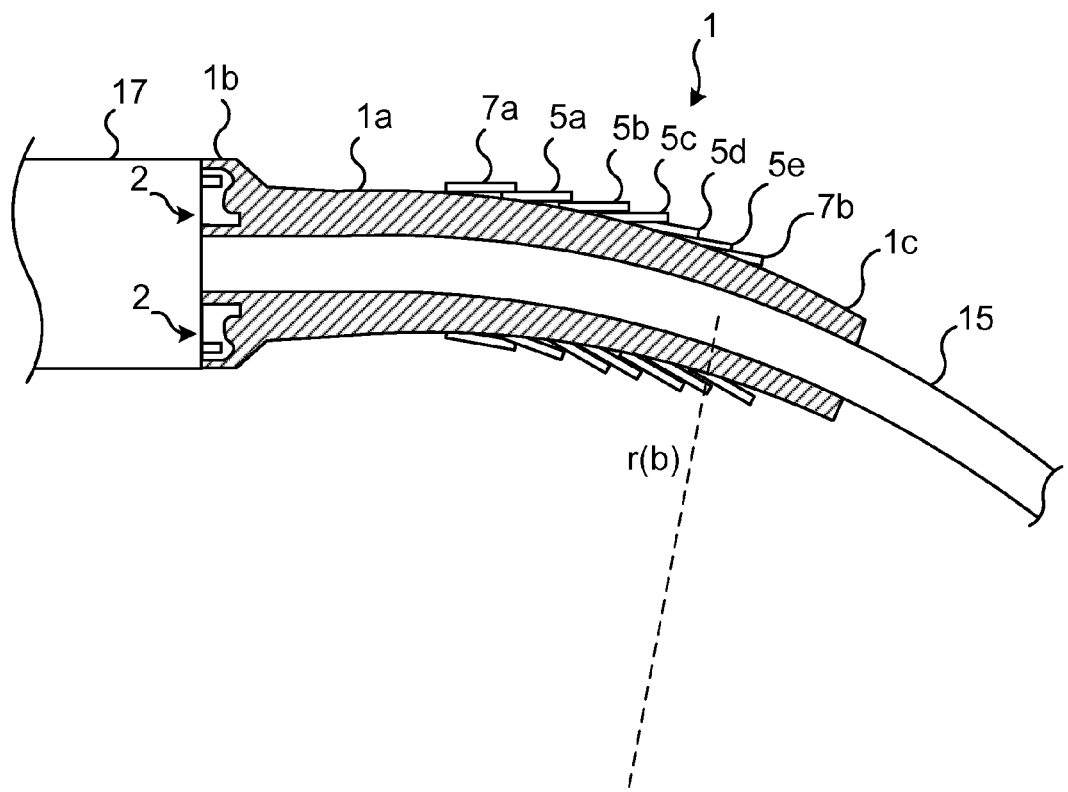
FIG. 2a depicts the bend stiffener in FIG. 1 when subjected to bending forces during a subsea power cable installation procedure.
Figure 2B:
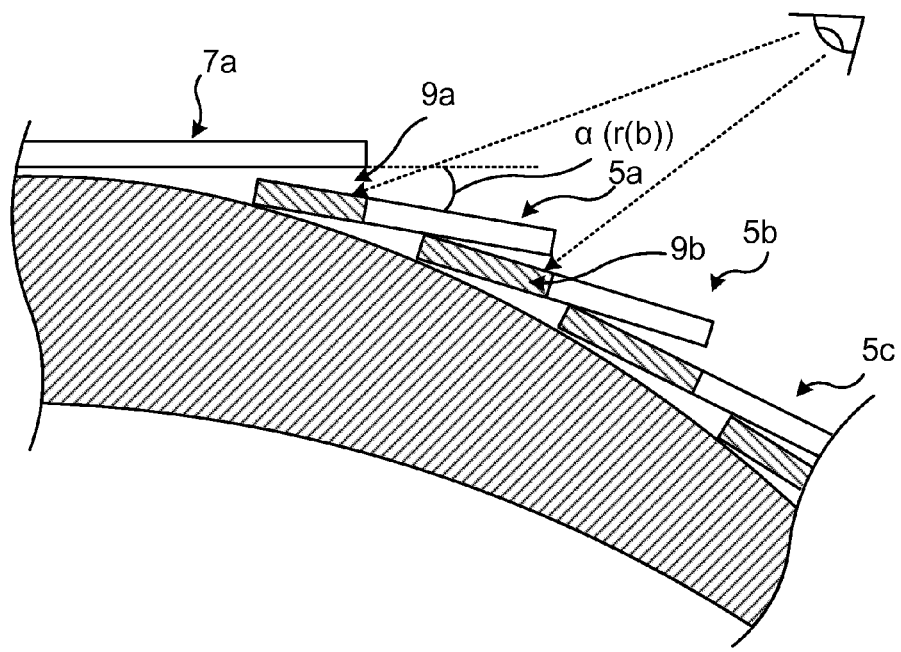

In FIG. 2a the bend stiffener 1 is attached to a rigid structure 17, such as the casing of a rigid joint. Such a situation may occur when a subsea power cable 15 is joined with another subsea power cable. This may be the case when a subsea power cable is to be installed at an offshore structure located very distantly from land and when it would generally not be feasible to manufacture and lay down a single piece subsea power cable the entire distance.

The bend stiffener 1 in the example in FIG. 2a has been bent with a force which provides a bending radius r(b), which is a function of the bending, smaller than the minimum bending radius of the bend stiffener 1, which is the minimum bending radius of the subsea power cable 15. This results in that the subsea power cable 15 arranged in the bend stiffener 1 is subjected to a bending radius r(b) smaller than the minimum bending radius. The proximal portions 9a maintain proximity to the body 1a, while the distal portions are distanced from their respective adjacent proximal portions thereby exposing the proximal portions. An angle α between each subsequent distal portion and proximal portion increases as a function of the bending radius r(b). A critical angle is obtained when the bending radius r(b) is below the minimum bending radius, resulting in the exposure of the proximal portions 9a and thus visualisation of the first visual appearance. Furthermore, in the area of the bend indicator 1 which is subjected to the highest bending forces bend indicators are slid apart in the axial direction; for example, of two adjacent bend indicators in the axial direction, a bend indicator closer to the base is displaced towards the base while the bend indicator closer to the top is displaced towards the top. The bend indicators thus slide apart, exposing the proximal portion of the bend indicator closer to the top.

Personnel carrying out operations involving installation of the subsea power cable 15 to the rigid structure 17 is thus provided with an optical indication that the bending radius r(b) is smaller than the minimum bending radius, and thus that an action must be taken in order to not damage the subsea power cable 15 due to bending stress.

During normal conditions, i.e. when the bend stiffener 1 is not subjected to bending forces, the angle α may be essentially zero and the distal portions 9b may bear against or essentially bear against an adjacent proximal portion 9a. The proximal portions 9a are thus in this case covered from view from essentially any direction, while the second visual appearance of the distal portions 9b is visible.

The bend stiffener presented herein may be utilised for any subsea power cable installation for which a bend stiffener is used to gradually increase the bending stiffness around the subsea power cable. It is especially beneficial for installation procedures, enabling installation engineers to visually detect whether the subsea power cable has obtained a bending radius below the minimum bending radius allowed for the subsea power cable. The bend stiffener allows visual detection of overbending even at great distances, and enables installation engineers to react promptly in the event a subsea power cable is overbent.

The inventive concept has mainly been described above with reference to a few examples. However, as is readily appreciated by a person skilled in the art, other embodiments than the ones disclosed above are equally possible within the scope of the inventive concept, as defined by the appended claims. Many variations of the bend stiffener presented herein are possible. The bend stiffener may for example according to one variation be fully covered with bend indicators. Bend indicators may thus be provided around the entire envelope surface along the entire length or essentially the entire length of the bend stiffener. Alternatively, only a small portion or several isolated portions may be provided with bend indicators both in the axial direction and along the perimeter. According to one variation the bend indicators cover at least 40% of the envelope surface of the body. In case the bend indicators are bands each bend indicator may according to one variation extend at most around half the perimeter.

The invention claimed is:

1. A bend stiffener comprising:
   a body having a base and a top, the body is tapering from the base to the top, wherein the body has a central through-opening extending from the base to the top, the through-opening is arranged to receive a subsea cable or umbilical, and
   a first bend indicator arranged on the body,
   wherein the first bend indicator has a proximal portion having a fixed end which is fixed relative to the body and a distal portion which has a free end, the first bend indicator extending from the fixed end to the free end in the axial direction of the body,
   wherein the distal portion covers a bend indication portion of the bend stiffener, the bend indication portion has a first visual appearance, and the distal portion has a second visual appearance, wherein the first visual appearance differs from a visual appearance of an area of the bend stiffener surrounding the bend indication portion.

2. The bend stiffener as claimed in claim 1, wherein the bend indication portion is the external surface of the body.

3. The bend stiffener as claimed in claim 1, wherein the bend stiffener comprises a second bend indicator having a proximal portion and a distal portion, and wherein the bend indication portion is the proximal portion of the second bend indicator, wherein the distal portion of the second bend indicator has the second visual appearance, the first bend indicator and the second bend indicator being arranged along the body in the axial direction.

4. The bend stiffener as claimed in claim 3, wherein the distal portion of the first bend indicator covers a first section of the distal portion of the second bend indicator.

5. The bend stiffener as claimed in claim 4, wherein a dimension of the first section is determined by a minimum bending radius allowed for the bend stiffener.

6. The bend stiffener as claimed in claim 1, wherein the bend indication portion is covered by the first bend indicator as long as the bending radius of the bend stiffener is above a predefined value.

7. The bend stiffener as claimed in claim 1, wherein the first bend indicator extends from the proximal portion towards the distal portion in a direction from the base towards the top.

8. The bend stiffener as claimed in claim 1, wherein the first visual appearance is a first colour and the second visual appearance is a second colour.

9. The bend stiffener as claimed in claim 1, comprising a plurality of bend indicators which includes the first bend indicator, wherein the plurality of bend indicators cover at least 40% of the envelope surface of the body.

10. The bend stiffener as claimed in claim 1, wherein the first bend indicator is a band extending around at least a portion of the perimeter of the body.

11. The bend stiffener as claimed in claim 10, wherein the first bend indicator extends around the entire perimeter of the body.

12. The bend stiffener as claimed in claim 10, wherein the first bend indicator extends at most around half the perimeter.

13. The bend stiffener as claimed in claim 1, wherein the first bend indicator is non-elastic.

* * * * *